(12) United States Patent
Persinger et al.

(10) Patent No.: US 11,685,094 B2
(45) Date of Patent: Jun. 27, 2023

(54) HEAT REMOVAL SYSTEM AND METHOD FOR AN INJECTION MOLDING MACHINE

(71) Applicant: Robert Bosch GmbH, Stuttgart (DE)

(72) Inventors: Michael Persinger, Fort Wayne, IN (US); Todd Freeman, Albion, IN (US); Julian Gabriel, Farmington Hills, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 428 days.

(21) Appl. No.: 16/859,300

(22) Filed: Apr. 27, 2020

(65) Prior Publication Data

US 2021/0331366 A1 Oct. 28, 2021

(51) Int. Cl.
*B29C 45/78* (2006.01)
*G05B 13/04* (2006.01)
*B29C 45/76* (2006.01)

(52) U.S. Cl.
CPC ............ *B29C 45/78* (2013.01); *G05B 13/042* (2013.01); *B29C 2045/7606* (2013.01); *B29C 2945/7604* (2013.01); *B29C 2945/76304* (2013.01); *B29C 2945/76531* (2013.01)

(58) Field of Classification Search
CPC ............ B29C 45/78; B29C 2045/7606; B29C 2945/7604; B29C 2945/76304; B29C 2945/76531; B29C 2948/92704; G05B 13/042
USPC ................................................ 700/225, 205
See application file for complete search history.

(56) References Cited

U.S. PATENT DOCUMENTS

| | | | |
|---|---|---|---|
| 6,290,882 B1 * | 9/2001 | Maus ............... | B29D 11/00269 264/328.8 |
| 7,934,386 B2 | 5/2011 | Rummel et al. | |
| 8,361,422 B2 | 1/2013 | Soukhojak et al. | |
| 8,931,262 B2 | 1/2015 | Quaade et al. | |
| 9,250,000 B2 | 2/2016 | Rosenfeld | |
| 10,030,900 B2 | 7/2018 | Sunderland et al. | |
| 2005/0150635 A1 * | 7/2005 | Luebke ................. | F25D 17/02 165/80.4 |
| 2015/0129172 A1 | 5/2015 | Zietlow et al. | |

(Continued)

*Primary Examiner* — Matthew J Daniels
*Assistant Examiner* — Gregory C. Grosso
(74) *Attorney, Agent, or Firm* — Michael Best & Friedrich LLP (57) ABSTRACT

An injection molding heat removal sensing and control system and method are provided for determining and controlling a heat transfer rate for a mold in a molding machine. The system includes an inflow temperature sensor for sensing an inflow temperature for coolant provided to the mold, an outflow temperature sensor for sensing an outflow temperature for coolant exiting the mold, and a flow rate sensor for sensing a flow rate for coolant through the mold. The electronic processor is also configured to calculate a heat transfer rate for the mold from the inflow temperature, the outflow temperature, the flow rate for the coolant, and the calculated mass and the temperature of the molten plastic. The processor determines a time lag between when heat enters the mold and when heat is removed by the coolant and pre-emptively adjusts coolant flow rate to provide uniform heat transfer throughout a molding cycle. The heat transfer rate and total energy removed can be determined and provided on the display.

17 Claims, 9 Drawing Sheets

(56) References Cited

U.S. PATENT DOCUMENTS

2019/0091909 A1  3/2019  Fontaine
2019/0337210 A1  11/2019  Hardie et al.

* cited by examiner

ND METHOD FOR AN INJECTION MOLDING MACHINE

HEAT REMOVAL SYSTEM AND METHOD FOR AN INJECTION MOLDING MACHINE

RELATED APPLICATIONS

There are no related applications.

BACKGROUND

The embodiments relate to a closed loop feedback and control system and method for heat transfer in a molding arrangement (molding machine, mold, plastic & cooling media). One application of this is injection molding of plastic and a mold with conformal cooling inserts.

In the injection molding industry, the cooling phase typically determines the length of the overall cycle time. This may be due to factors such as controlled cooling rate requirements or simply due to the part not reaching safe ejection temperature. Complex channels are created in a mold near a part surface and in difficult to reach areas, to potentially reduce cooling time and improve part quality by consistent uniform cooling of the part.

Additive manufacturing methods, such as 3-D printing are used to build molds providing conformal cooling. The designs can be complex and have contour along a part surface. This is also useful for multi-cavity molds utilizing additive manufacturing to build conformal cooling channels. Conformal cooling designs enable a greater rate of cooling and uniform cooling of parts formed by injection molding. Cooling circuit design is optimized by simulation, such as by utilizing SigmaSoft® software. Conformal cooling designs can be tested by thermal imaging to ensure no areas lack cooling effect.

One issue with injection molding is that the system includes a temperature control unit that operates to keep the temperature of coolant at a constant value. However, when molten plastic is injected into a mold the mold temperature increases and the coolant temperature increases as a result. There is a lag in time before the coolant is returned to the desired temperature. A method of maintaining the coolant at a constant temperature is desirable.

SUMMARY

A method of providing cooling uniformity or minimizing cooling time in a mold or die is disclosed. One example is in an injection mold having passageways for coolant that provide conformal cooling to reduce the cooling period of the molding machine, provide uniform cooling, and/or achieve a target level of polymer crystallization in cases where crystalline (typically semi-crystalline) polymer is used. The heat transfer calculation and control system includes coolant inflow and coolant outflow temperature sensors, a coolant flow rate sensor, inputs from the molding machine for temperature and mass/flow rate of molten plastic being injected and a controller to determine heat transfer rate from these measurements, as well as other inputs, such as specific heat capacity of the plastic, steel, and coolant. Total heat removed from the injection molding machine is also determined.

In one embodiment, a method for determining heat removal of a molding machine having a mold includes the steps of: sensing an inflow temperature for a coolant provided to the mold; sensing an outflow temperature for a coolant exiting the mold; sensing a coolant flow rate of the coolant through the mold. The method further includes calculating a heat transfer rate for the mold based at least on the inflow temperature, the outflow temperature, the coolant flow rate, and the mass and temperature of the molten plastic. The method determines a time lag between when heat enters the mold and when heat is removed by the coolant, and pre-emptively adjusts coolant flow rate to provide uniform heat transfer throughout the molding cycle.

In one embodiment, a method determines heat removal of a molding machine having a mold with conformal cooling. The method includes the steps of: determining an inflow temperature for a coolant provided to the mold; determining an outflow temperature for a coolant exiting the mold; determining a flow rate of a coolant through the mold; calculating a heat transfer rate for the mold based at least on the inflow temperature, the outflow temperature, and the flow rate; and displaying the heat transfer rate for the mold.

Another embodiment includes an injection molding heat removal sensing system for determining a heat transfer rate for a mold in a molding machine. The injection molding heat removal sensing system includes: an inflow temperature sensor for determining an inflow temperature for a coolant provided to the mold; an outflow temperature sensor for determining an outflow temperature for a coolant exiting the mold; a flow rate sensor for determining a flow rate for a coolant through the mold; and an electronic processor and a memory. The electronic processor is configured to calculate a heat transfer rate for the mold from the inflow temperature, the outflow temperature, and the flow rate for a coolant; and display the heat transfer rate on a display.

Other aspects of the invention will become apparent by consideration of the detailed description and accompanying drawings.

DETAILED DESCRIPTION

Before any embodiments of the arrangements are explained in detail, it is to be understood that the arrangement is not limited in its application to the details of construction and the arrangement of components set forth in the following description or illustrated in the following drawings. The arrangement is capable of other embodiments and of being practiced or of being carried out in various ways.

Figure 1:
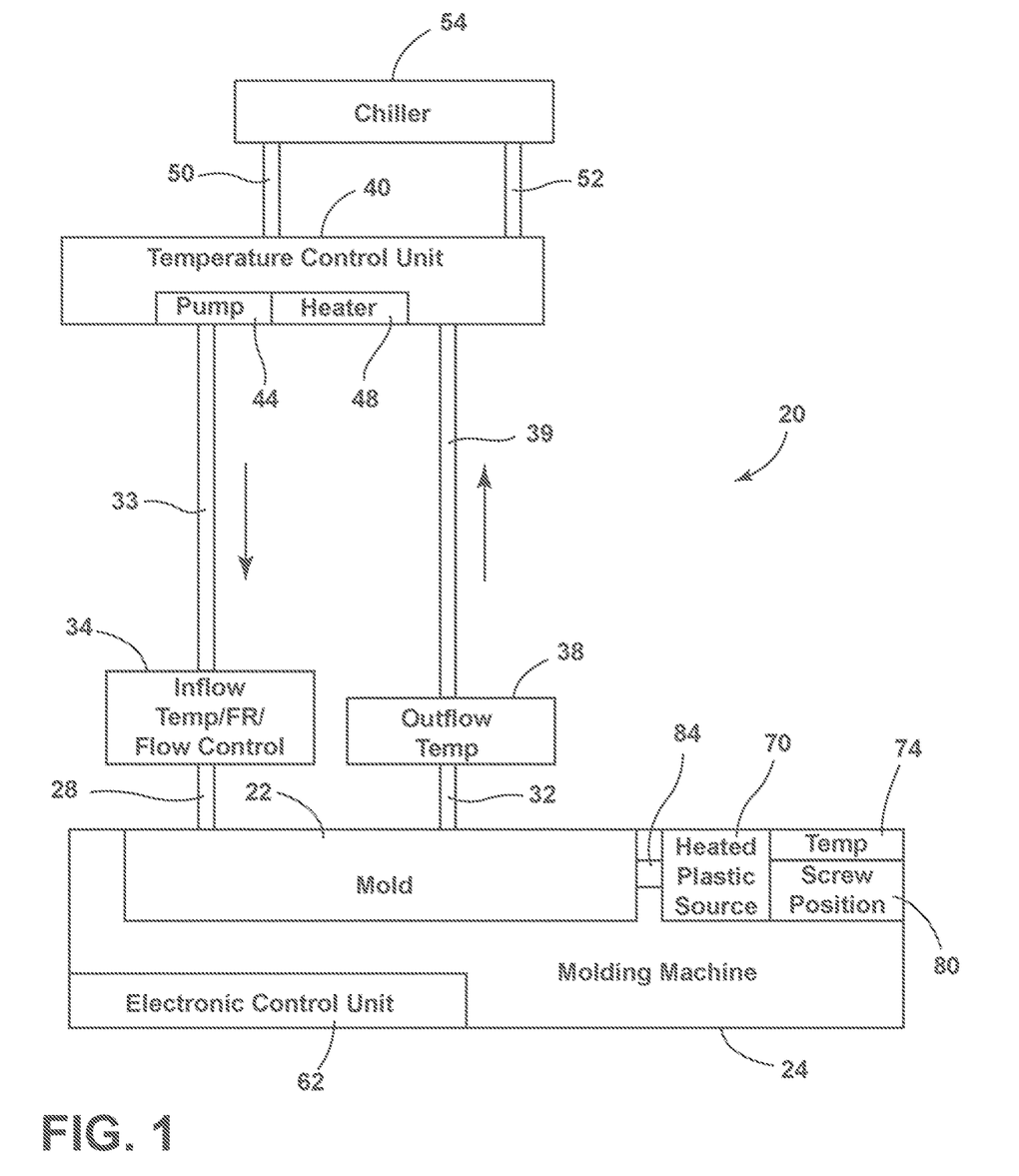
FIG. 1 is a block diagram of an embodiment of an injection molding system.

FIG. 1 illustrates an injection molding system 20 including a mold 22 or mold insert disposed in a molding machine 24 and having an inlet 28 or inlet opening for receiving a coolant and an outlet 32 or outlet opening for removing the coolant. An inflow temperature/flow rate sensor/flow controller 34 senses the temperature of the incoming coolant from connector 33 and the flow rate thereof. A separate flow control is provided as an always open adjustable valve that is capable of increasing the flow rate of coolant to the mold. Thus, in one embodiment the inflow temperature/flow rate sensor/flow controller 34 is a single multi-sensor device. The inflow temperature/flow rate sensor/flow controller 34 provides the coolant to the inlet 28 for the mold 22. An outflow coolant temperature sensor 38 senses the temperature of the coolant exiting the mold 22 in the molding machine 24 via outlet 32 and provides the coolant to connector 39. In one embodiment, the flow controller can be an actuator for a valve that is fully open in a circuit and there are multiple parallel circuits with valves, wherein one or more of the valves can be partially closed to restrict the flow in the parallel circuit(s). Valves in the parallel circuits can be opened to result in an increased flow in other circuits to balance heat transfer in different parts of a mold or insert. In another embodiment, the flow controller 34 can be an actuator for a valve that is always partially open, but configured to open further to increase flow rate of coolant to the mold 22. In another embodiment, the pump 44 is operated at a greater speed to increase flow rate of coolant. A temperature control unit 40, such as a Thermolator®, receives the coolant from the connector 39.

The temperature control unit 40 includes one or more temperature control units used to preheat and keep the molds at a temperature set point by providing a coolant, such as water or oil, to the mold 22 inserted in a molding machine 24. In some embodiments, the temperature control unit 40 is designed to control process temperatures in a range from about 20° F. to about 650° F. The temperature control unit 40 includes a pump 44 for pumping coolant through the mold 22 and a heater 48 for heating coolant when necessary. The temperature control unit 40 attempts to maintain the temperature of the coolant at a set point value. The temperature control unit 40 includes a cold coolant inlet 50 for selectively receiving coolant from a chiller 54 and a dump valve 52 for selectively providing coolant that is too warm from the temperature control unit 40 to the chiller 54.

The injection molding system 20 includes an electronic control unit 62 shown as a part of the molding machine 24. The electronic control unit 62 includes an electronic processor and one or more non-transitory, computer-readable memory modules (not shown in FIG. 1). In some embodiments, a random access memory ("RAM") module and a read-only memory ("ROM") module are provided for the electronic control unit 62 of the molding machine 24. The electronic control unit 62 can include multiple electronic processors, additional computer-readable memory modules, multiple I/O interfaces, and/or additional components or modules (e.g., hardware, software, or a combination thereof). While shown as a part of the molding machine 24, the electronic control unit 62 can be a separate element in some embodiments. The electronic control unit 62 is in communication with the temperature control unit 40, the inflow temperature/flow rate sensor/flow controller 34, the outflow coolant temperature sensor 38 and additional elements.

FIG. 1 further shows that the molding machine 24 includes a heated plastic source 70. The heated plastic source 70 includes a molten plastic temperature sensor 74 for sensing the temperature of the molten plastic and a screw position sensor 80 on the injection molding machine 24 and the position of the screw is typically output as a linear position (e.g. 100 mm of shot size) or as a volume (e.g. 50 cubic centimeters (cc) of molten plastic). In the case of volume output, this is a calculation of the molding machine 24 based on barrel diameter and linear position. So whether the machine outputs linear position of the screw or outputs a volume calculated from linear position, the density of the molten material must also be provided and will vary depending on the material used. With these two pieces of information, mass can be calculated. Ideally, each usage of a mold would have a material associated with it, so when a mold 22 goes into the press, the sensors identify the mold and the machine 24 knows what the molten material injected needs to be. The plastic material information, including density and heat capacity is received from a database and used for the calculations to determine a mass or quantity of the molten plastic injected into the mold 22 via a molten plastic injection valve 84. The electronic control unit 62 receives signals from the molten plastic temperature sensor 74 and the screw position sensor 80 and controls the heated plastic source 70 and the molten plastic injection valve 84.

Returning to FIG. 1, in operation, the pump 44 provides coolant to the mold 22 of the molding machine 24. The molding machine 24 operates in injection molding cycles of: controlling a molten plastic injection valve 84 to receive a mass of a heated molding resin to form a product, cooling the product, and ejecting the product from the molding machine 24, and repeating the process for multiple molding cycles. The electronic control unit 62 controls the temperature and the volume/mass of molten plastic being injected into the mold 22 of the molding machine 24 to manufacture molded products.

Figure 2:
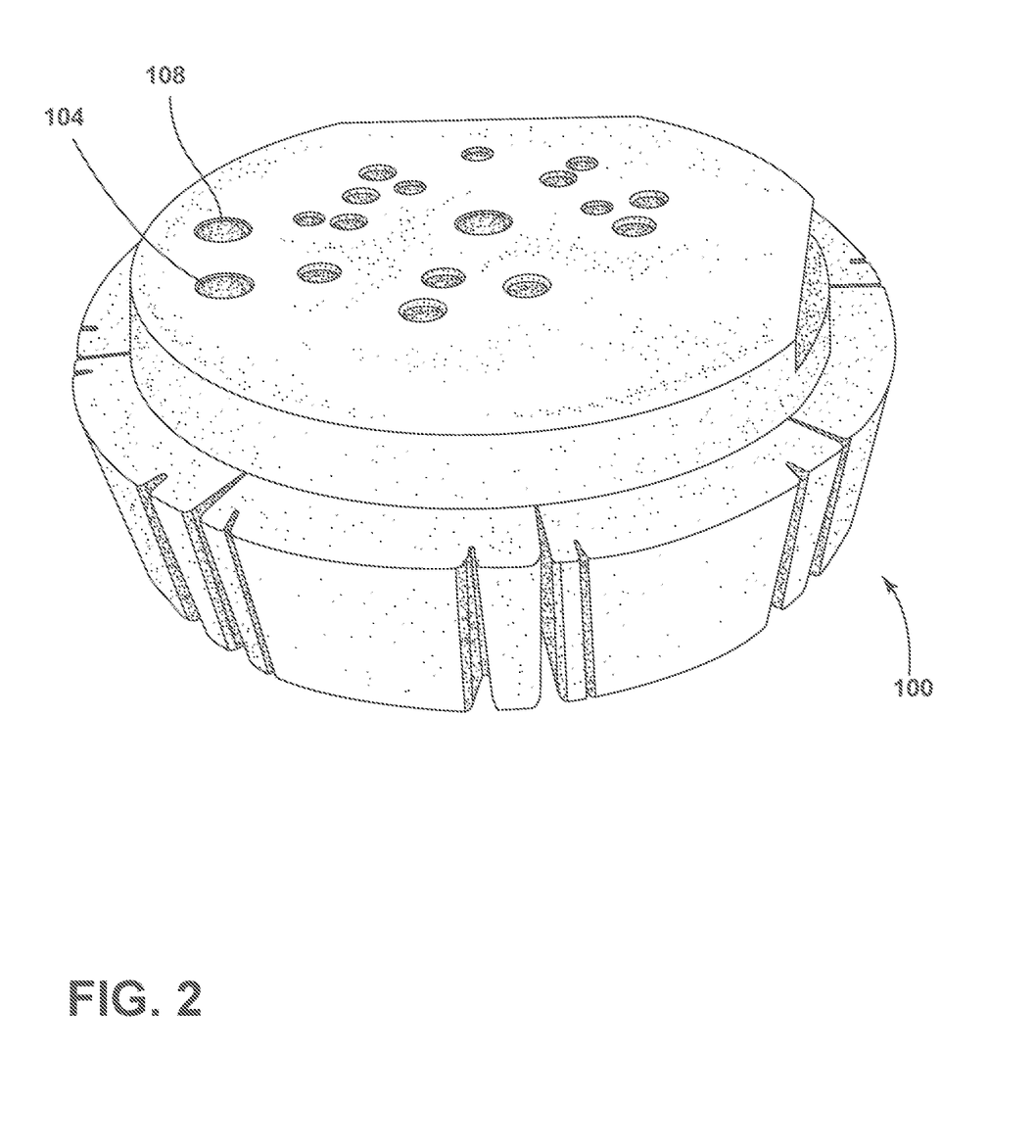
FIG. 2 is a perspective view of a molding insert.

FIG. 2 shows a mold insert 100 for use in the molding machine 24 shown in FIG. 1. The mold insert 100 includes an input port 104 for receiving coolant and an output port 108 for outputting coolant. A plurality of part removal apertures are also illustrated on a top surface of the mold insert 100.

Figure 3:
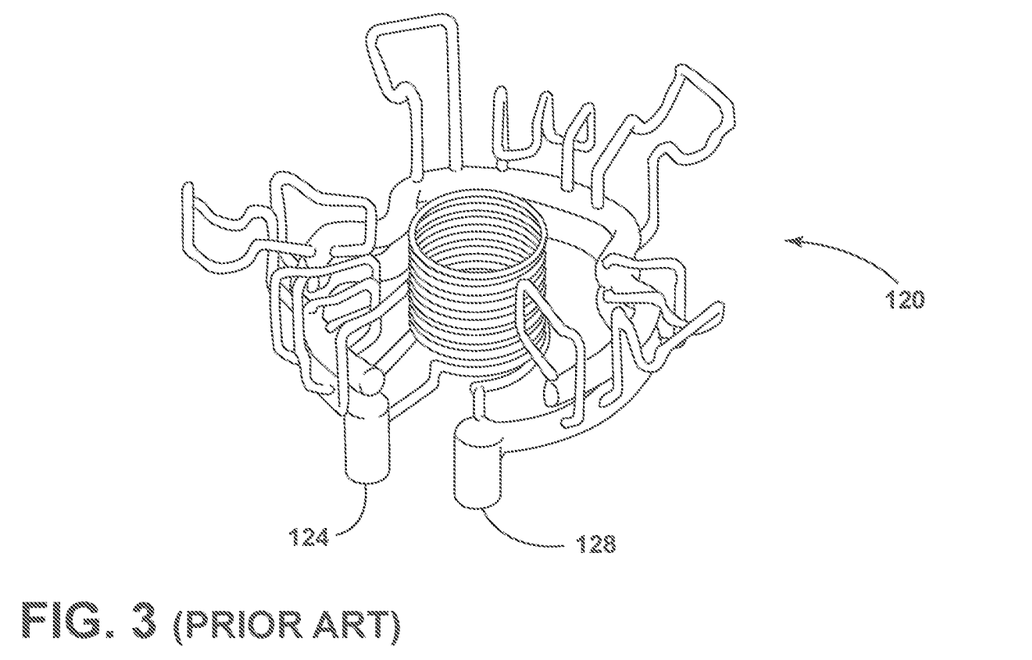
FIG. 3 is a perspective view depiction for internal cooling passages for a prior art mold insert.

FIG. 3 shows a perspective view of coolant flow passages 120 for a mold insert. The arrangement shown in FIG. 3 is a prior art arrangement that does not provide conformal cooling. Input passage 124 corresponds to the input port 104 for receiving coolant and output passage 128 corresponds to the output port 108 for outputting coolant.

Figure 4:
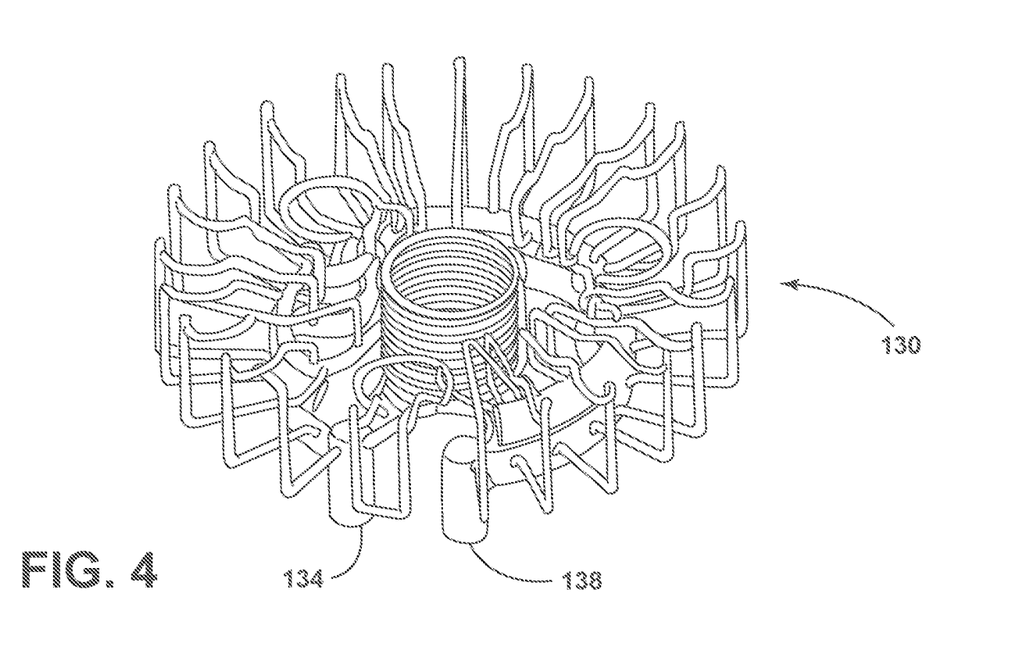
FIG. 4 is a perspective view depiction for internal cooling passages for one embodiment of a conformal cooling mold insert.

The coolant flow passages 130 of FIG. 4 illustrate an improved arrangement for improved speed in quickly cooling the mold insert 100 in a molding machine 24, and thus cooling an injection molded product provided therein. The improved speed enables the molding machine 24 to manufacture more products over time. Input passage 134 corresponds to the input port 104 for receiving coolant and output passage 138 corresponds to the output port 108 for outputting coolant.

Injection Molding Heat Removal System

Figure 5:
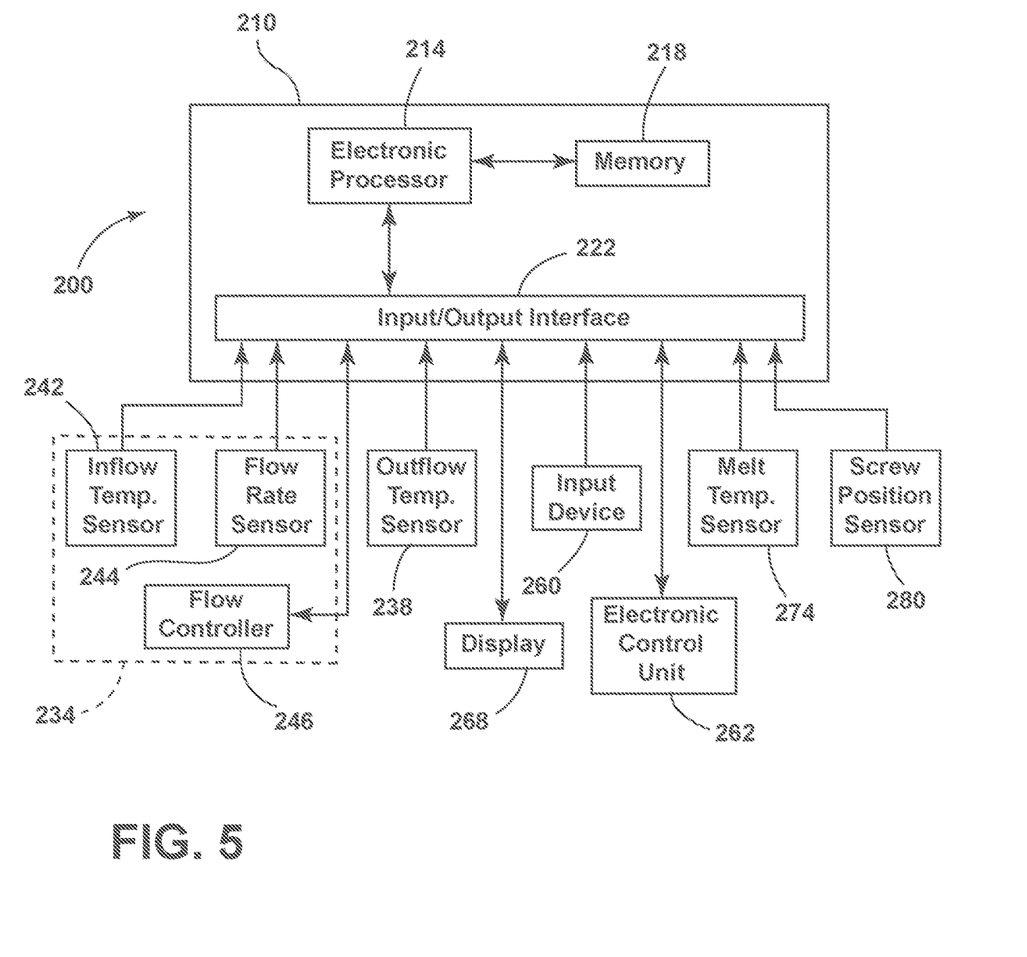
FIG. 5 is a block diagram of an injection molding heat removal sensing and control system.

FIG. 5 is a block diagram of an injection molding heat removal sensing and control system 200 that includes an electronic heat removal determination and control unit 210 that includes an electronic processor 214 and a non-transitory, computer-readable memory 218. In some embodiments, the memory 218 is provided as a random access memory ("RAM") module and a read-only memory ("ROM") module. The electronic heat removal determination and control unit 210 includes an input/output interface 222 so that the electronic processor 214 communicates with additional devices shown in FIG. 5. The electronic heat removal determination and control unit 210 can include multiple electronic processors, additional computer-readable memory modules, multiple I/O interfaces, and/or additional components or modules (e.g., hardware, software, or a combination thereof). In one embodiment, the electronic heat removal determination and control unit 210 is a black box element separate from the elements shown in FIG. 1.

In one embodiment, the injection molding heat removal sensing and control system 200 shown in FIG. 5 includes a combination inflow temperature sensor/flow rate sensor/flow controller 234 as illustrated in FIG. 1 as a single inflow temperature/flow rate sensor/flow controller. In another embodiment, the coolant inflow temperature sensor 242, the coolant flow rate sensor 244, and the coolant flow controller 246 are separate elements as shown in FIG. 5. The injection molding heat removal sensing and control system 200 includes a coolant outflow temperature sensor 238 at the outflow path of the molding machine 24. The injection molding heat removal sensing and control system 200 also receives inputs from a molten plastic temperature sensor 274 and the screw position sensor 280. The injection molding heat removal sensing and control system 200 also controls the coolant flow controller 246 to control the flow rate of coolant.

In one embodiment, an input device 260 is provided for a user to manually enter coolant properties. The injection molding heat removal sensing and control system 200 shown in FIG. 5 also includes a display for displaying cooling results, such as the heat transfer rate for the molding machine and total energy or total heat removed during a molding cycle or even during overall use of the molding machine 24.

Finally, the electronic heat removal determination and control unit 210 is in communication with an electronic control unit 262 of the injection molding system 20. The This arrangement enables the electronic heat removal determination and control unit 210 to provide an alert, such as a message or audio/visual warning when cooling of the molding machine 24 is not operating properly. In some instances, operation of the molding machine 24 can be stopped or ended.

Operation of Feedback Control of Coolant Flow Rate

Figure 6:
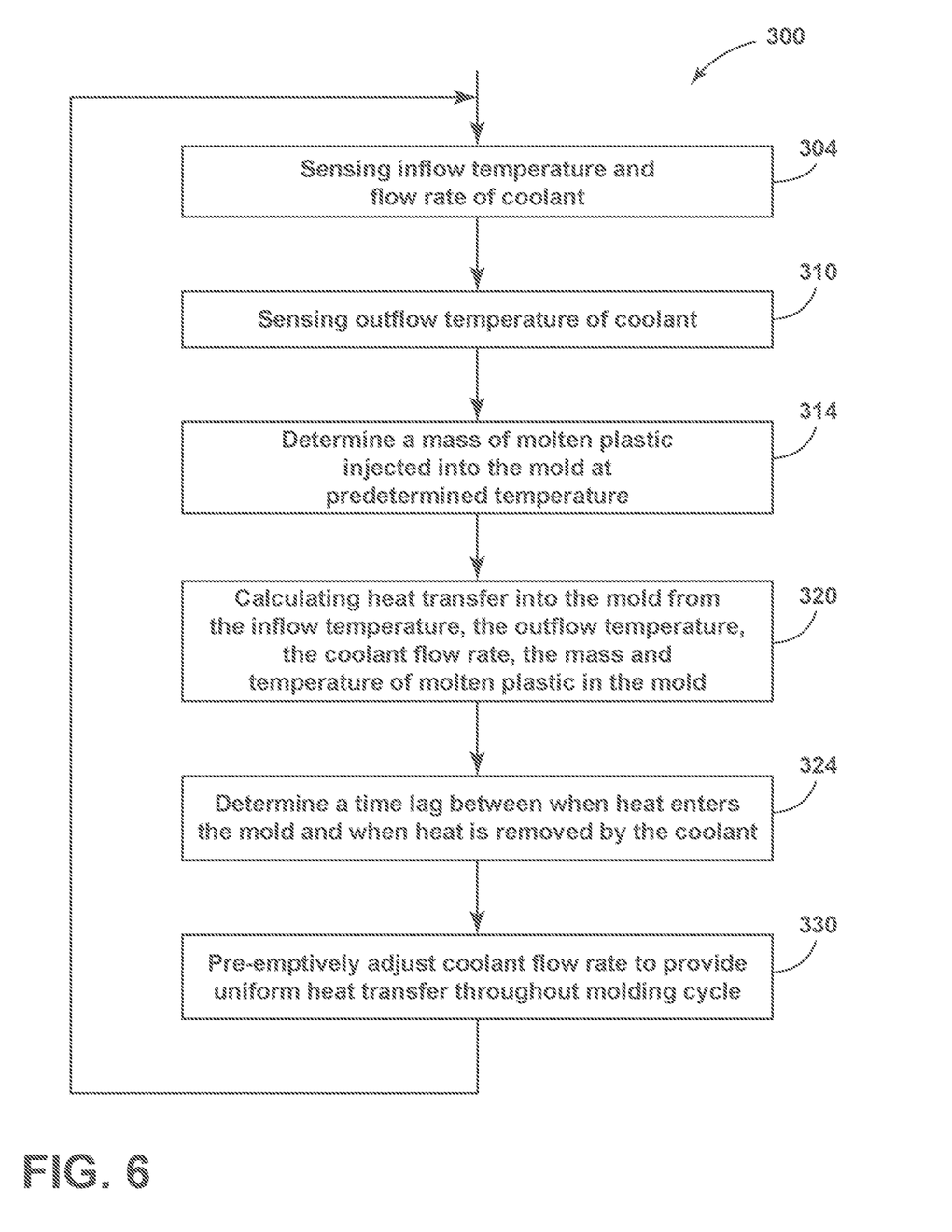
FIG. 6 is a flow chart of operation of closed loop feedback control to anticipate heating of the coolant and perform adjustments to maintain the temperature of coolant.

FIG. 6 shows a closed loop feedback control flowchart 300 wherein the electronic processor 214 executes a program to anticipate heating of the coolant and to perform adjustments to maintain the temperature of coolant by increasing the flow rate of the coolant as follows.

At step 304, the electronic processor 214 receives the coolant inflow temperature from the coolant inflow temperature sensor 242 and the coolant flow rate from the flow rate sensor 244. The. At step 310, the electronic processor 214 receives the outflow temperature from the coolant outflow temperature sensor 238. The electronic processor 214 advances to step 314.

At step 314, the electronic processor 214 receives the melt temperature of plastic from the molten plastic temperature sensor 274 and a screw position value from the screw position sensor 280 when a volume of molten plastic is injected into the mold. Besides the determined or sensed temperature, the density and other properties of the molten plastic is manually input earlier or otherwise known by the electronic processor 214. The input device 260 is provided for inputting a density of the molten plastic in some embodiments. The mass of molten plastic is determined based on shot size/volume from the screw position, temperature and the density of the molten plastic. The electronic processor 214 advances to step 320.

At step 320, the electronic processor 214 is configured to calculate heat transfer into the mold from the inflow temperature, the outflow temperature, the coolant flow rate, and the calculated mass and the temperature of molten plastic in the mold 22. The electronic processor 214 advances to step 324.

At step 324, the electronic processor 214 determines a time lag between when heat enters the mold 22 and when heat is removed by the coolant. The electronic processor 214 advances to step 330.

At step 330, the electronic processor 214 is configured to pre-emptively adjust coolant flow rate to provide uniform heat transfer throughout a molding cycle. The electronic processor 214 provides a signal to flow controller 246 to adjust or increase the size of a flow path by further opening a valve or other element. In another embodiment, the pump 44 operates faster to provide more flow. In this manner, the additional flow permits cooling of the mold immediately upon the injection of a shot of molten plastic into the mold 22 from the heated plastic source 70 via the molten plastic injection valve 84.

At another time at the end of the injection molding cycle, a molded product is removed from the mold 22. The removal of the molded product removes heat from the mold. Thus, the ejection of the product is utilized to reduce the flow rate into the mold 22 by the electronic processor 214 controlling the flow controller 246.

In one embodiment, the electronic processor 214 performs closed loop feedback control as a proportional-integral-derivative (PID) controller functioning as a control loop mechanism to provide continuously modulated control.

Operation of Heat Transfer Rate Display

Figure 7:
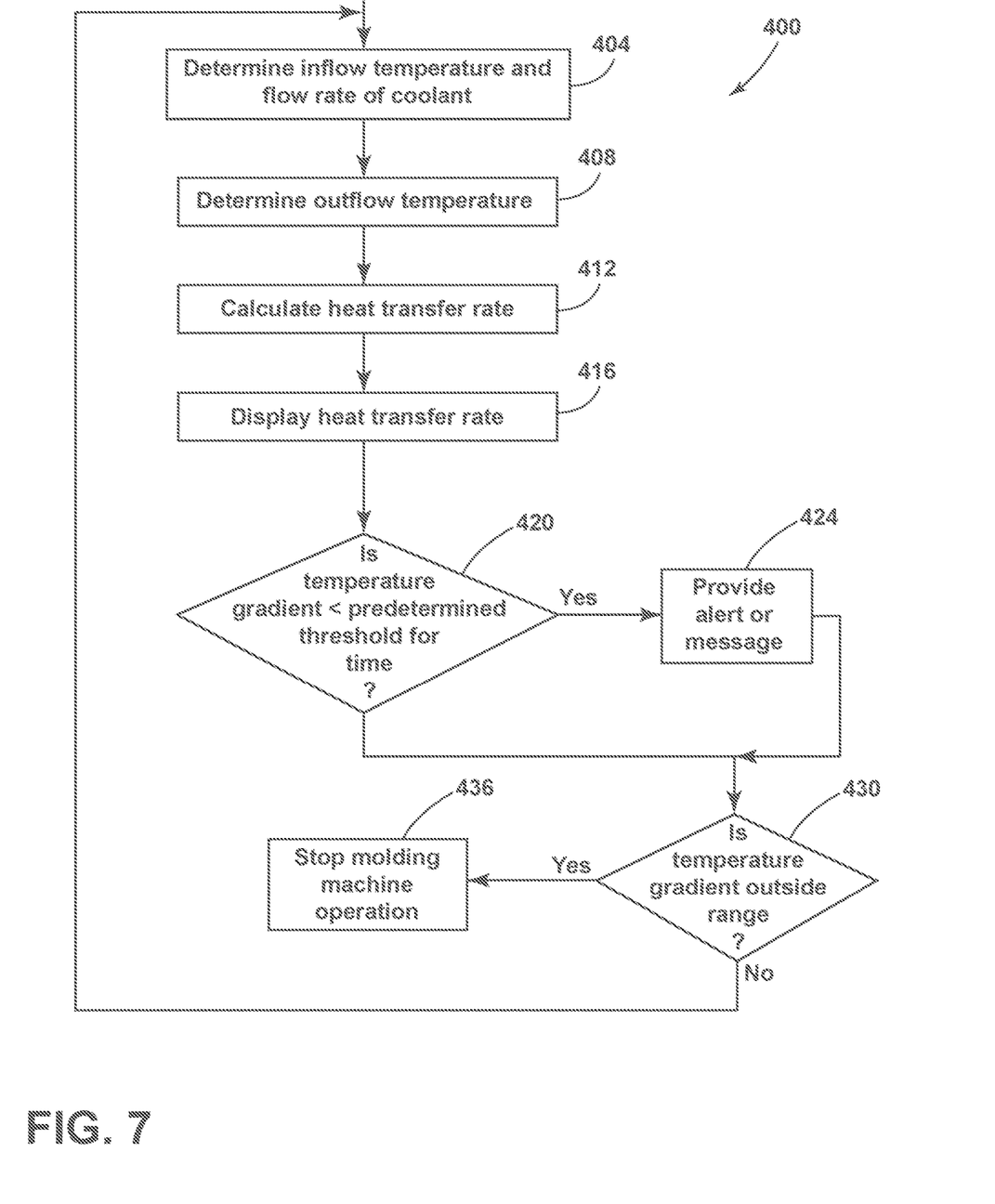
FIG. 7 is a flow chart of operation of a heat transfer rate display.

In operation, the electronic processor 214 also executes a program shown in the flowchart 400 shown in FIG. 7. The electronic processor 214 determines the heat transfer rate of the injection molding system 20 in a method as follows.

At step 404, the electronic processor 214 receives the inflow temperature from the inflow temperature sensor 242 and the flow rate of coolant from the flow rate sensor 244. In some embodiments, the step 404 represents two separate steps, when a multi-sensor device is not utilized. The electronic processor 214 then advances to step 408.

At step 408 shown in FIG. 7, the electronic processor 214 receives an outflow temperature from the coolant outflow temperature sensor 238. The electronic processor 214 advances to step 412. At step 412, the electronic processor 214 calculates a heat transfer rate for the injection molding heat removal sensing and control system 200 from an equation as follows.

Heat Transfer Rate=Specific heat*coolant flow rate*change in temperature (temperature gradient) of coolant from an inlet 28 to an outlet 32 of the molding machine 24.

After calculating the heat transfer rate, the electronic processor 214 advances to step 416 shown in FIG. 7, wherein the heat transfer rate for the mold is displayed on the display 268.

The electronic processor 214 then advances to decision step 420. At decision step 420, the electronic processor 214 determines whether the temperature gradient is less than a predetermined threshold for at least a heating time during the molding cycle after the mold is filled. When the temperature gradient between the inflow temperature and the outflow temperature is too small or decreases below a predetermined threshold, the decision step advances to step 424 to provide an alert or message to an operator of a molding machine 24. The message or alert can be provided on display 268 and/or an audible message is provided by a loudspeaker (not shown). In the event that the temperature gradient is proper, the electronic processor 214 advances to decision step 430. In one embodiment, the alert includes a message that maintenance of the molding machine 24 or the mold 22 is required or necessary.

At decision step 430, the electronic processor 214 determines whether the temperature gradient is outside of a normal predetermined range of values for at least operating for portions of the molding cycle. If so, the electronic processor 214 advances to step 436.

At step 436, the electronic processor 214 is configured to stop operation or end the operation of the molding machine 24. Stopping operation of the molding machine only occurs to prevent damage thereto or to a mold. If the temperature gradient is within a normal predetermined range of values, the electronic processor 214 returns to step 404 and repeats the steps including the display of the heat transfer rate. Each event that repeats in FIG. 7 is another iteration or interval for the molding machine 24. Thus, the display of heat transfer rate and total energy removed over time is updated at each iteration.

Operation of Total Energy Display

Figure 8:
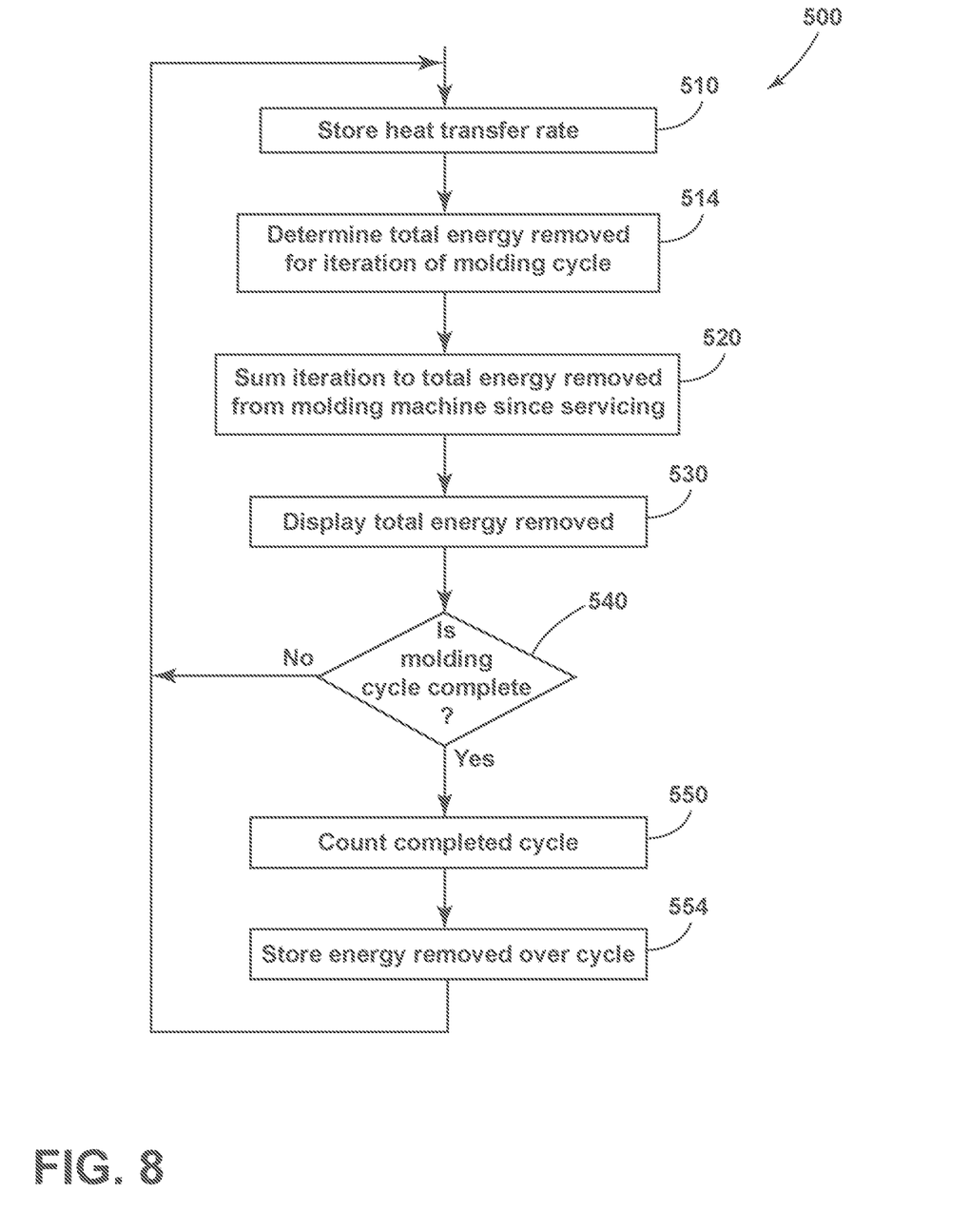
FIG. 8 is a flow chart of operation of a total energy display.

FIG. 8 is a flow chart 500 of a method for determining heat removal or energy removal and providing same to a total energy display. In a first step 510, the heat transfer rate is stored in memory 218 by the electronic processor 214. Thereafter, at step 514, the electronic processor is configured to determine energy removed for an iteration of a molding cycle. At step 520, the electronic processor 214 is configured to sum the iteration of energy with the total energy removed from the molding machine since servicing as previously determined by the electronic processor 214. Namely, the energy removed by a coolant during the iteration of a molding cycle is summed to the previous energy removed from the molding machine since servicing.

The program or flow chart executed by the electronic processor 214 advances to step 530. At step 530, the electronic processor 214 is configured to provide the total energy removed from the molding machine and at the iteration to a user on the display 268. Thus, a display 268 of energy or total heat removal is provided.

Thereafter, the electronic processor 214 advances to decision step 540 to determine if a molding cycle is complete. If the molding cycle is not complete, the electronic processor 214 returns to step 510 and repeats the steps for the next iteration of the molding cycle. When the molding cycle is complete, the electronic processor 214 advances to step 550.

At step 550, the electronic processor 214 is configured to count a completed molding cycle and store the count in memory 218. Further, at step 554, the electronic processor 214 is configured to determine the energy removed over the molding cycle and configured for storing same in memory 218. Thereafter, the electronic processor 214 returns to step 510 and repeats the process for another molding cycle.

Figure 9:
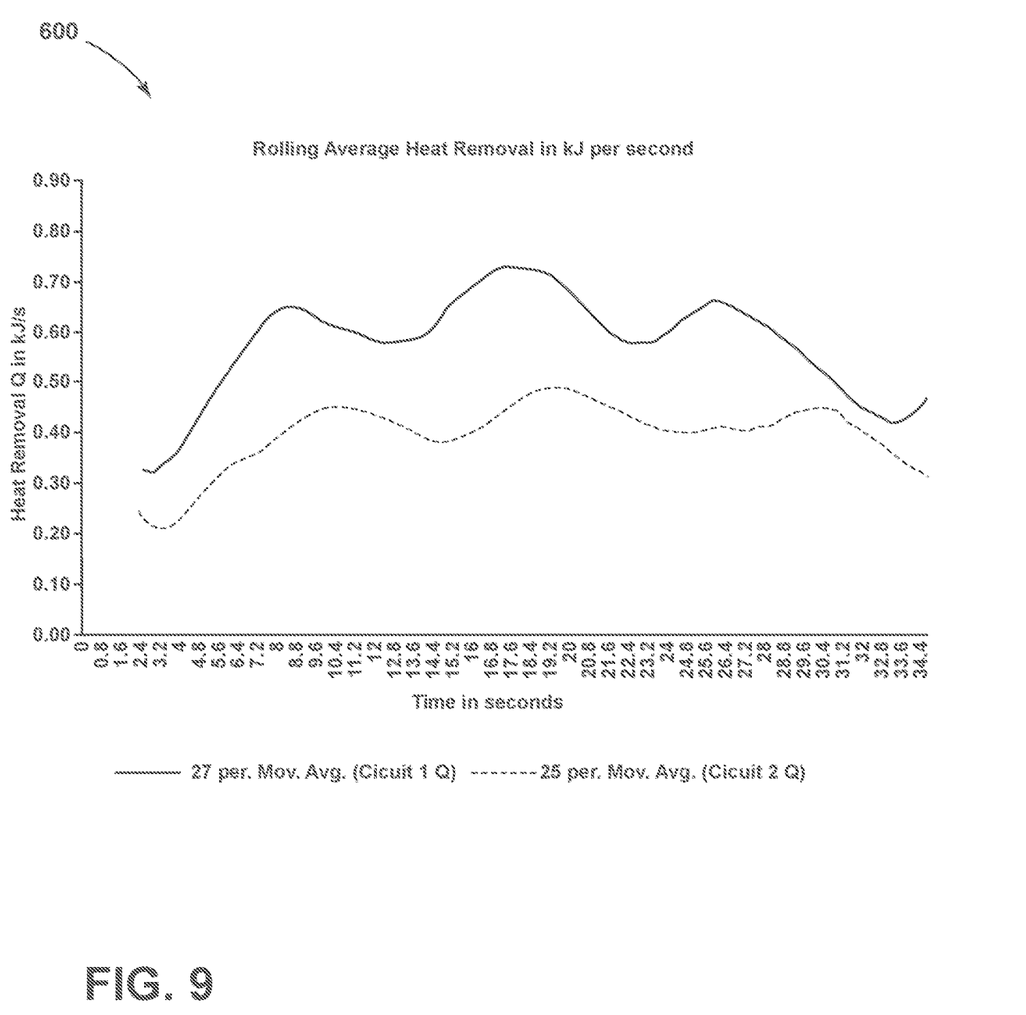
FIG. 9 is a graph of rolling average for energy/heat removal from a molding machine.

FIG. 9 shows one example of a graph 600 for rolling average heat removal in kilojoules per second for a molding machine. The graph 600 is created using the equation Heat Transfer rate=Specific heat*fluid flow rate*change in temperature from inlet to outlet. Examples of two different metrics are shown as measured in the system. The graph 600 shows where the system is more efficient at heat removal and where improvements are possible.

Figure 10:
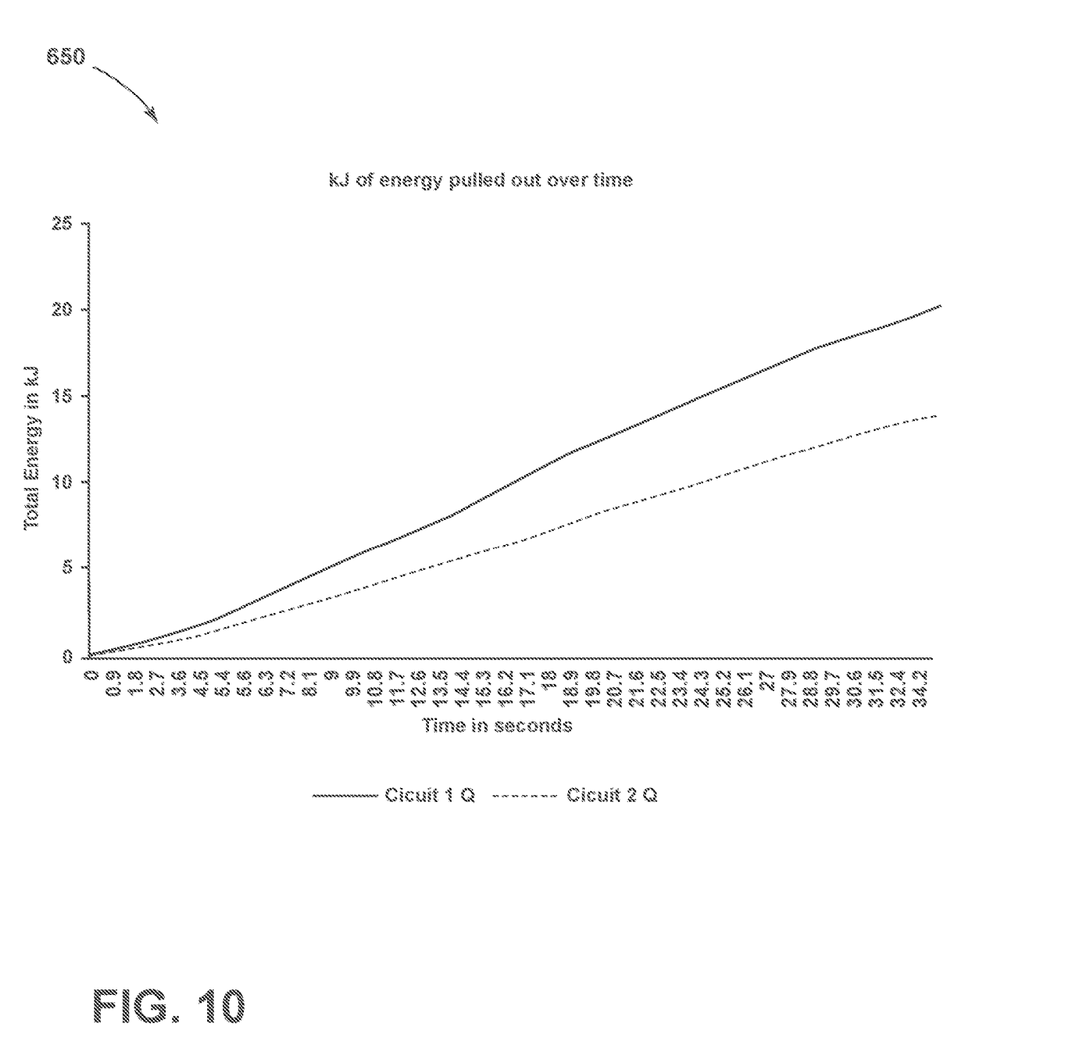
FIG. 10 is a graph of total energy/heat removed from a molding machine.

FIG. 10 shows a graph 650 of total energy in kilojoules removed from a molding machine over time for a first circuit/machine and for a second circuit/machine. The total energy is total energy pulled out over a 35 second injection process for one port by the coolant. Thus, there is a time lag shown between when heat enters the mold and when heat is removed by the coolant to pre-emptively adjust coolant flow rate to provide uniform heat transfer through a molding cycle. Different circuits/machines have different values for energy removed by a coolant over time.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (e.g., stored on non-transitory computer-readable medium) executable by one or more processors. As such, it should be noted that a plurality of hardware and software based devices, as well as a plurality of different structural components may be utilized to implement the embodiments.

The molding material for injection can be a plastic, polymer, or specific materials such as polyamide, acrylic, polycarbonate, polystyrene, acrylonitrile butadiene styrene polypropylene, polyethylene, thermoplastic polyurethane, thermoplastic rubber, and other materials.

It should be understood that although the system depicts components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

While FIGS. 6-8 show flowcharts with steps in a certain order, the order of steps can be different. Further, multiple programs shown in the flowcharts are executed simultaneously in some embodiments.

Various features, advantages, and embodiments are set forth in the following claims.

What is claimed is:

1. A method for determining heat removal of a molding machine having a mold, comprising:
sensing an inflow temperature for a coolant provided to the mold;
sensing an outflow temperature for the coolant exiting the mold;
sensing a coolant flow rate of the coolant through the mold;

sensing a heat transfer into the mold via determining a mass of molten plastic that is provided at a determined temperature;

calculating a heat transfer rate for the mold with an electronic processor based at least on the inflow temperature, the outflow temperature, the coolant flow rate, and the determined mass and the determined temperature of the molten plastic;

determining a time lag between when heat enters the mold and when heat is removed by the coolant with the electronic processor;

pre-emptively adjusting coolant flow rate to provide uniform heat transfer throughout a molding cycle in view of the heat transfer rate and the time lag; and stopping operation of the molding machine when a temperature gradient between the inflow temperature and the outflow temperature is outside a predetermined range of values.

2. The method according to claim 1, wherein an input device is provided for inputting a density of the molten plastic.

3. The method according to claim 2, wherein the determined mass of molten plastic is determined based on shot size and on the density of the molten plastic, and wherein the molding machine identifies the mold placed therein and provides the density and heat capacity of the molten plastic for use with the identified mold.

4. The method according to claim 1, wherein an input device is provided for a user to manually enter coolant properties.

5. The method according to claim 4, wherein the coolant is water.

6. The method according to claim 1, including the steps of:
storing the heat transfer rate in a memory;
determining total energy removed by the coolant with the electronic processor; and
displaying the total energy removed by the coolant.

7. The method according to claim 6, wherein the display of the heat transfer rate and the total energy removed over time is updated at each iteration.

8. A method for determining heat removal of a molding machine having a mold with conformal cooling, comprising:
sensing an inflow temperature for a coolant provided to the mold;
sensing an outflow temperature for a coolant exiting the mold;
sensing a coolant flow rate of the coolant through the mold;
calculating a heat transfer rate for the mold with an electronic processor based at least on the inflow temperature, the outflow temperature, and the coolant flow rate;
displaying the heat transfer rate for the mold; storing the heat transfer rate in a memory; determining total energy removed by the coolant with the electronic processor;
displaying the total energy removed by the coolant; and
stopping operation of the molding machine when a temperature gradient between the inflow temperature and the outflow temperature is outside a predetermined range of values.

9. The method according to claim 8, wherein the display of the heat transfer rate and the total energy removed over time is updated at each iteration.

10. The method according to claim 8, wherein an input device is provided for inputting a density of a molten plastic.

11. The method according to claim 8, wherein a determined mass of molten plastic is determined based on a shot size and on a density of the molten plastic, and wherein the molding machine identifies the mold placed therein and provides the density and a heat capacity of the molten plastic for use with the identified mold.

12. A method for determining heat removal of a molding machine having a mold with conformal cooling, comprising:
sensing an inflow temperature for a coolant provided to the mold;
sensing an outflow temperature for a coolant exiting the mold;
sensing a coolant flow rate of the coolant through the mold;
calculating a heat transfer rate for the mold with an electronic processor based at least on the inflow temperature, the outflow temperature, and the coolant flow rate;
displaying the heat transfer rate for the mold; and
providing an alert that maintenance of the molding machine or the mold is required when a temperature gradient between the inflow temperature and the outflow temperature decreases below a predetermined threshold.

13. The method according to claim 12, wherein the alert includes a message that the maintenance of the molding machine or the mold is required.

14. The method according to claim 13, including stopping operation of the molding machine when the temperature gradient is outside a predetermined range of values.

15. The method according to claim 12, wherein the heat transfer rate=Specific heat*coolant flow rate*change in temperature of the coolant from an inlet to an outlet of the molding machine.

16. The method according to claim 12, wherein an input device is provided for inputting a density of a molten plastic, and pre-emptively adjusting coolant flow rate to provide uniform heat transfer throughout a molding cycle in view of the heat transfer rate and a time lag.

17. The method according to claim 12, wherein a determined mass of molten plastic is determined based on shot size and on a density of the molten plastic, and wherein the molding machine identifies the mold placed therein and provides the density and a heat capacity of the molten plastic for use with the identified mold.

* * * * *